United States Patent [19]

Baatrup et al.

[11] Patent Number: 4,558,759
[45] Date of Patent: Dec. 17, 1985

[54] HYDROSTATIC STEERING DEVICE STEERING WHEEL TRAVEL LIMITS

[75] Inventors: Johannes V. Baatrup, Sonderborg; Harry E. Pedersen, Nordberg, both of Denmark

[73] Assignee: Danfoss A/S, Nordborg, Denmark

[21] Appl. No.: 557,065

[22] Filed: Dec. 1, 1983

[30] Foreign Application Priority Data

Dec. 14, 1982 [DE] Fed. Rep. of Germany ....... 3246137

[51] Int. Cl.$^4$ .............................................. B62D 5/06
[52] U.S. Cl. ...................................... 180/132; 74/495; 91/42; 91/44; 92/24; 180/79; 180/134; 180/139; 180/235; 188/265; 192/8 R; 280/90; 303/89
[58] Field of Search ................. 180/132, 79, 134, 135, 180/136, 137, 138, 139; 280/89, 90; 188/265; 303/89; 92/23, 24, 27, 28; 91/42, 43, 44; 74/495; 192/8 R

[56] References Cited

U.S. PATENT DOCUMENTS

| 905,912 | 12/1908 | Nehring | 192/8 R |
| 1,700,864 | 2/1929 | Tredway | 192/8 R |
| 2,075,288 | 3/1937 | Jay | 180/79 X |
| 3,695,402 | 10/1972 | Klemm | 192/8 R |
| 3,993,158 | 11/1976 | Weight et al. | 180/134 |
| 4,286,684 | 9/1981 | Berg | 180/139 X |
| 4,356,759 | 11/1982 | Ljubimov et al. | 180/132 X |

Primary Examiner—Joseph F. Peters, Jr.
Assistant Examiner—Mitchell J. Hill
Attorney, Agent, or Firm—Wayne B. Easton

[57] ABSTRACT

The invention relates to a hydrostatic steering device having a servomotor connectable to wheels to be steered. The travel limits of the servomotor are sensed with position sensors which function to operate a locking apparatus which mechanically prevents further turning of the steering wheel upon a travel limit being reached in either direction.

10 Claims, 3 Drawing Figures

HYDROSTATIC STEERING DEVICE STEERING WHEEL TRAVEL LIMITS

The invention relates to a hydrostatic steering device comprising a steering motor, a steering valve controlling same which is adjustable against the force of neutral position springs depending on rotation of a steering wheel or the like and measuring means traversed by fluid flowing to or from the steering motor, in its two operating positions connects motor conduits leading to the steering motor to a source of pressure fluid or a container depending on the direction, and in its neutral position separates these motor conduits therefrom, and limiting position sensors as well as operating elements which are activated when the sensors respond and suppress the exertion of pressure on the steering motor.

In a known hydrostatic steering device of this kind (U.S. Pat. No. 3,993,158), two vicinity sensors are provided which respond when the parts to be steered approach a mechanical abutment. The sensor signal is amplified and activates an operating element in the form of a magnetic valve which connects the pressure fluid directly to the container. The aim of this is to bring the motor to a standstill.

In practice, however, it has been found that despite the suppression of the exertion of pressure on the steering motor, there is nevertheless a hard mechanical impact on the abutment of the parts to be steered. In addition, the zero position of the steering wheel recognizable for example by the position of the steering wheel button was often displaced in relation to the straight-ahead position of the steering motor.

The invention is based on the problem of providing a hydrostatic steering device of the aforementioned kind in which the parts to be steered are certain to come to rest in a position defined by the limiting position sensors.

This problem is solved according to the invention in that the operating elements are formed by a locking apparatus which mechanically stops the steering wheel from being turned further.

The mechanical retention of the steering wheel closes the steering valve. The motor conduits are blocked and the steering motor very rapidly comes to a standstill. It is therefore no longer possible for the parts to be steered to move further under the influence of inertia and thereby cause fluid to be compressed by the steering motor towards the container by way of the steering valve which is still open. There is very little likelihood of the parts to be steered striking the mechanical abutment. By reason of the fact that the steering wheel is mechanically retained in the limiting position, there is also no danger of it being turned further, even on the application of larger forces, and thereby changing its zero position relatively to the straight-ahead position of the steering motor under the compression of leakage fluid.

Desirably, the locking apparatus engages the shaft of the steering wheel. This provides a particularly compact construction.

In a preferred example, the locking apparatus comprises a double-sided friction brake activatable by each of the limiting position sensors. As soon as the sensor responds, the steering wheel is locked under friction.

In another recommended construction, the locking apparatus comprises two oppositely acting ratchet wheel locks each activatable by one of the limiting position sensors. The ratchet wheel locks merely prevent further turning of the steering wheel in a direction towards the limiting position but they in no way affect rotation in the opposite direction.

The ratchet wheels may be connected to the steering wheel shaft by a friction clutch. This permits the ratchet wheel locks to be small because the friction clutch can be designed to respond when such a torque is exerted on the steering wheel that the ratchets would be destroyed. For example, the friction clutch can be set to a torque of about 49 Nm to 59 Nm. It may act solely mechanically but also pneumatically or hydraulically.

The locking apparatus may be actuatable by at least one electromagnet. Another possibility is for the locking apparatus to comprise a pneumatically or hydraulically actuatable pressure piston subjected to a return force. Both kinds lead to a very simple construction which is subject to few faults.

With particularly advantage, the limiting position sensors are formed by plungers which are displaceable in a cylinder, the cylinder being connected directly to the pressure space of the associated pressure piston. The force exerted by the steering motor on the plunger directly actuates the locking apparatus.

It is advisable for the plunger to have a smaller diameter than the pressure piston. The plunger must therefore traverse a certain path before the full actuating force acts on the pressure piston. This leads to very gentle braking in the limiting position of the parts to be steered.

It is in this connection favourable for the plunger cylinders to be connected to the return conduit of the steering motor by way of a throttle and for the return conduit to be provided downstream of the connecting point with a pressure retaining valve of which the pressure setting is lower than the response pressure of the pressure piston. In this way, the pressure piston will always receive only a firing pulse which then decreases so that the steering wheel can easily turn back. In addition, the plunger is reset automatically when the steering motor is actuated again.

In some cases, it is advisable to provide the motor conduits with overpressure values. In this way, pressure peaks occuring on sudden stopping of the parts to be steered can be reduced.

Two preferred examples of the invention will now be described in more detail with reference to the drawing, wherein.

Figure 1:
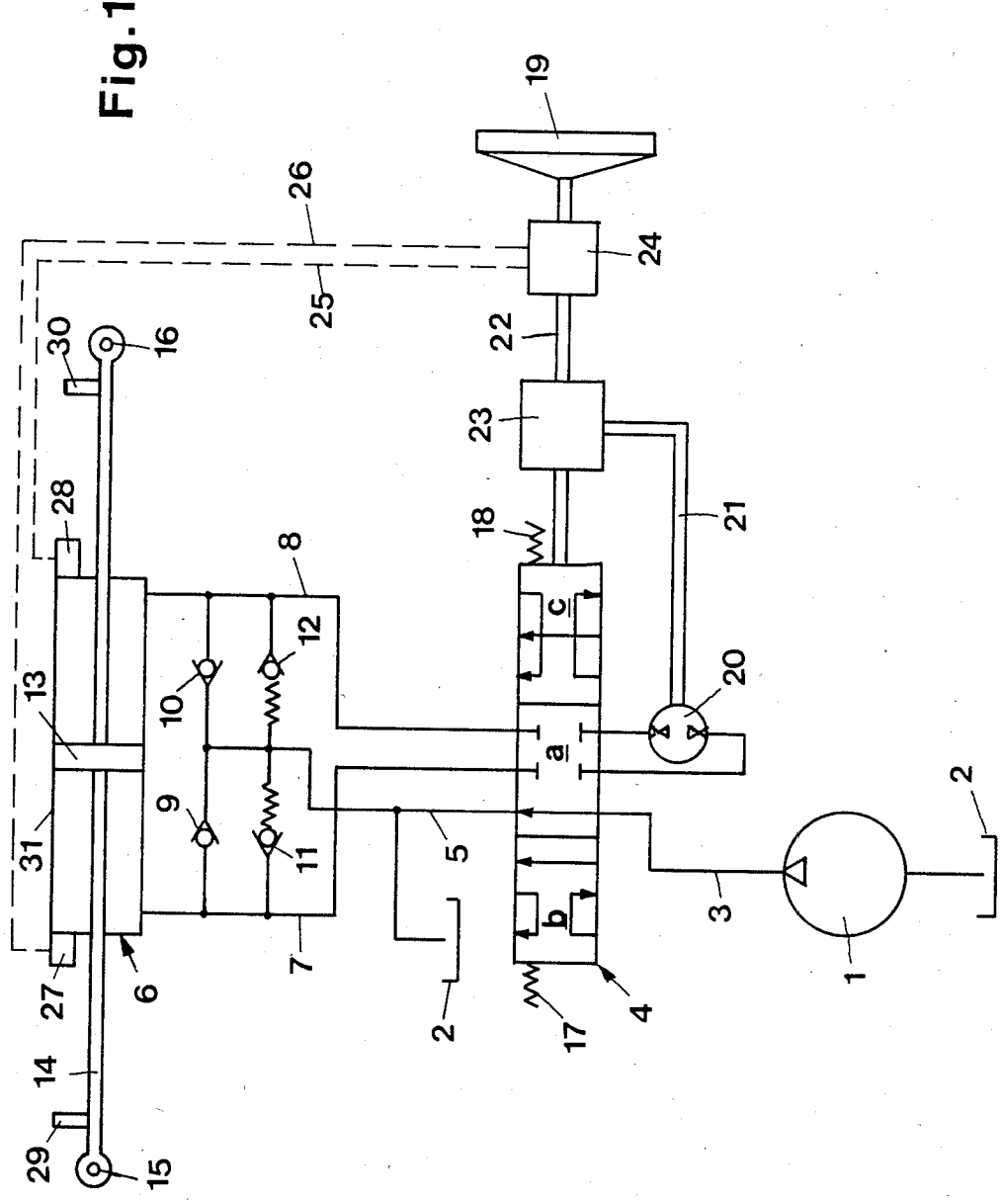
FIG. 1 is a diagrammatic representation of the hydrostatic steering device.

According to FIG. 1, a pump 1 delivers pressure fluid from a container 2 by way of a pump conduit 3 to a steering valve 4 which can assume a neutral position a and two operating positions b and c. In the neutral position a, the pump conduit 3 is connected by way of a container conduit 5 to the container 2. In the operating positions, the pump 1 and container 2 are connected to a steering motor 6 by way of motor conduits 7 and 8. These motor conduits are in communication with the container conduit 5 by way of two suction valves 9 and 10 as well as two over-pressure valves 11 and 12. The steering motor 6 comprises a piston 13 and a rod 14 which is connected thereto and to the ends 15 and 16 of which there may be applied the parts to be steered, for example a steering linkage.

The steering valve 4 is under the influence of two neutral position springs 17 and 18. With the aid of a steering wheel 19, it can be brought out of the neutral position into one of the operating positions b or c depending on the direction. This causes a measuring apparatus 20 in the form of a hydraulic motor to be connected into the pressure fluid supply conduit leading to the steering motor 6. Its outlet 21 is, as is the shaft 22 of the steering wheel 19, so connected to a comparing device 23 that the throughflow measured by the motor 20 causes resetting of valve motion caused by the steering wheel 19. In the neutral position a, the motor conduits 7 and 8 as well as the two sides of the measuring motor 20 are blocked.

A locking apparatus 24 engages the shaft 22 of the steering wheel 19. This apparatus is connected by way of two signalling conduits 25 and 26 to a respective limiting position sensor 27 or 28 which, in response to sensing a position sensor 29 or 30, transmits a signal for actuating the locking apparatus 24. Thus, before the piston 13 can abut the ends of the cylinder 31, a signal is given to the locking apparatus 24. This locks the steering wheel 19. Under the influence of the measuring motor 20 and the neutral position springs 17 or 18, the steering valve 4 therefore moves to the neutral position a in which the two motor conduits 7 and 8 are blocked. The piston rod 14 therefore remains in the limiting position thus notified. Further movement is not possible. If, by reason of the inertia of the steering system, high pressure peaks occur in a motor conduit, these peaks can be reduced by way of one of the over-pressure valves 11 or 12. The amount of fluid in this case flowing off to the container 2 is so small that the stopping function of the locking apparatus remains practically unaffected. Since the steering wheel 19 is locked, it can not be turned further unintentionally.

Figure 2:
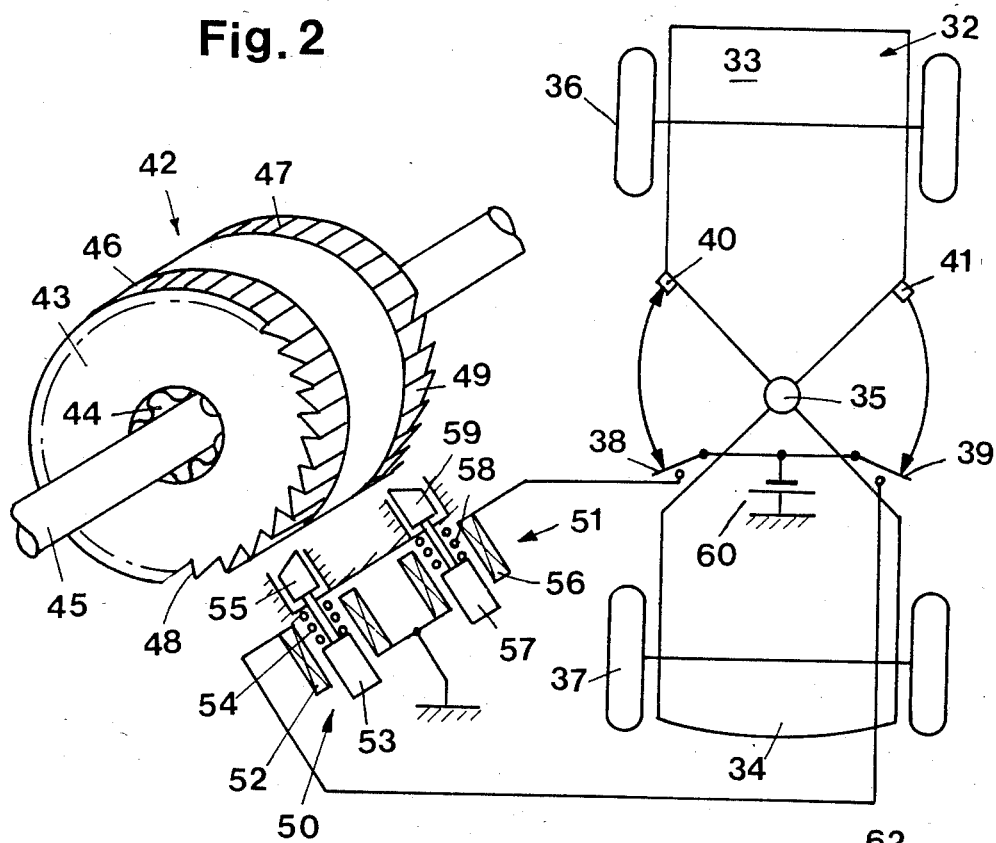
FIG. 2 shows a locking apparatus with ratchet wheel lock.

In the FIG. 2 embodiment, it is assumed that the steering motor 6 acts on a vehicle 32 with articulated frame steering. Two frame members 33 and 34 are therefore interconnected by a hinge 35. Each frame member carries at least one pair of wheels 36 or 37. In this case, the limiting position sensors are micro-switches 38 and 39 on the frame member 34. They can be actuated by position sensors 40 or 41 on the frame member 33.

The locking apparatus 42 comprises an outer sleeve 43 placed on the shaft 45 of the steering wheel with the interpositioning of a corrugated spring which forms a friction clutch 44. The outer sleeve comprises two ratchet wheels 46 and 47. The teeth 48 of ratchet wheel 46 have opposite inclination, as do the teeth 49 of ratchet wheel 47. Each ratchet wheel is associated with an electromagnet 50 or 51. The electromagnet 50 comprises an exciter coil 52 and an armature 53 which is subjected by a return spring 54 and seeks to push a pawl 55 into the ratchet wheel 46. The electromagnet 51 comprises an exciter coil 56 and an armature 57 which is subjected to a return spring 58 and seeks to push a pawl 59 into the ratchet wheel 47. The electromagnets with a respective micro-switch 38 or 39 are connected in series with a common voltage source 60.

When the position sensor 40 closes the micro-switch 38, the electromagnet 51 is energised. By engaging in the ratchet wheel 47, the pawl 59 locks the shaft 45 against further rotation in the last obtaining rotary direction. The steering valve therefore closes. Further turning is impossible. On the other hand, turning back of the shaft 45 does not require large forces. In the other limiting position, when the position sensor 41 closes the micro-switch 39, the electromagnet 50 responds and the pawl 55 engages in the ratchet wheel 46. The conditions are similar as for the other limiting position. If very large forces are exerted on the shaft 45 that might damage the pawls 55 or 59, the friction clutch 44 responds so that damage is impossible even if the locking apparatus 42 is of weak design.

Figure 3:
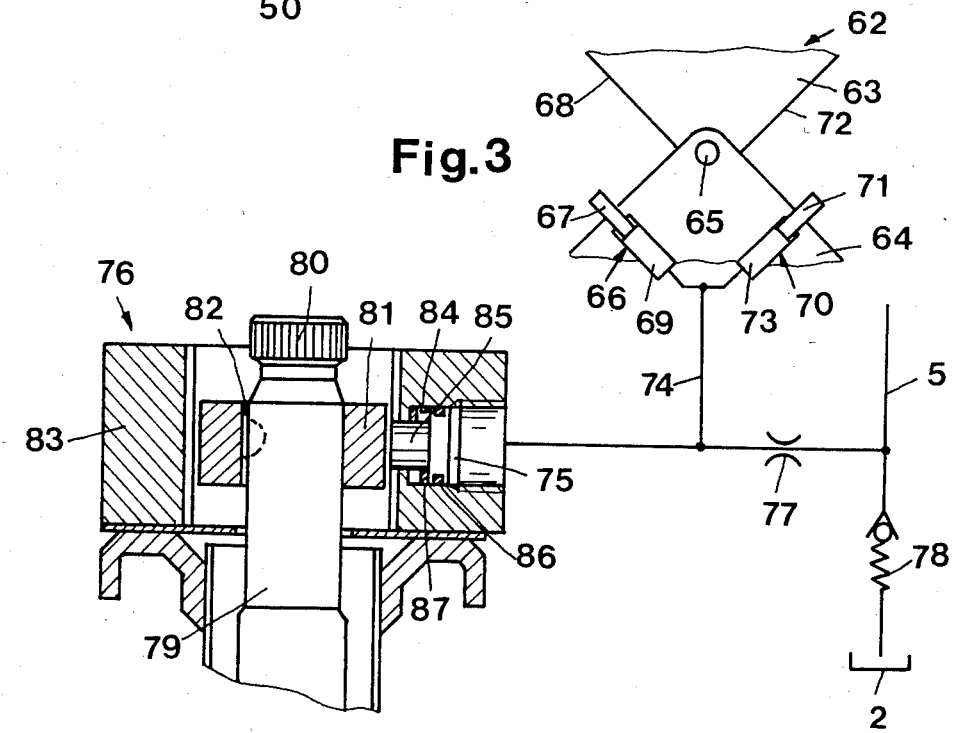
FIG. 3 shows a locking apparatus with a friction brake.

FIG. 3 indicates an articulated vehicle 62 with two frame members 63 and 64 interconnected by a hinge 65. The limiting position sensor 66 is a plunger cylinder of which the plunger 67 can make contact with the end walls 68 of the frame member 63 and thereby be displaced in its cylinder 69. The limiting position sensor 70 is likewise a plunger cylinder of which the plunger 71 can co-operate with the end walls 72 of the frame member 63 and be thereby displaced in its cylinder 73. The two cylinders are connected by a conduit 74 on the one hand to a pressure space 75 in a locking apparatus 76 and on the other hand by way of a throttle 77 to the return conduit 5 at a position separated from the container 2 by a pressure retaining valve 78.

In the locking apparatus 76, the shaft 79 on the head 80 of which the steering wheel can be placed comprises a brake ring 81 fixed against rotation on the shaft 79 by a key 82. In the housing 83 there is a cylindrical bore containing a displaceable brake pressure piston 85 which is provided with a sealing ring 86. An annular corrugated spring 87 acts against the pressure in the pressure space 75.

When the plunger 67 or 71 is actuated, a higher pressure is produced in the pressure space 75 by which the brake pressure piston 85 is pressed against the brake ring 81. Consequently, the shaft 79 can no longer be turned and the steering valve 4 blocks the motor conduits. However, the pressure towards the tank is reduced by way of the throttle 77 so that the steering wheel can subsequently again be turned in the opposite direction.

The pawls 55 and 59 may also be actuated pneumatically or hydraulically. The locking apparatus can also be applied to a different position, for example to a shaft connected to the steering wheel shaft by gears. The steering device may be of the 'non-reaction' or the 'reaction' type.

We claim:

1. A hydrostatic steering system, comprising, pump and tank means, a steering servomotor having two control ports, valve means having right and left turn positions for directing pressurized fluid from said pump means to either of said control ports and directing exhaust fluid from the other of said control ports to said tank means, steering means for controlling said valve means including shaft means, moveable means moveably responsive to the operation of said servomotor, limiting position sensor means responsive to movement of said moveable means to a limiting position, and locking apparatus means responsive to said sensor means for mechanically stopping movement of said steering shaft means.

2. A hydrostatic steering apparatus according to claim 1 wherein said locking apparatus means engages said steering shaft means.

3. A hydrostatic steering apparatus according to claim 1 wherein said limiting position sensor means includes two limiting position sensors, said locking apparatus means including friction brake means actuated by either of said limiting position sensors.

4. A hydrostatic steering apparatus according to claim 1 wherein said limiting position sensor means includes two limiting position sensors, said locking apparatus means including two ratchet wheel locks which operate in opposite directions and are actuated respectively by said limiting position sensors.

5. A hydrostatic steering apparatus according to claim 4 wherein said ratchet wheel locks are connected to said steering shaft means by friction clutch means.

6. A hydrostatic steering apparatus according to claim 4 wherein said ratchet wheel locks are operated by electromagnetic means.

7. A hydrostatic steering apparatus according to claim 1 wherein said locking apparatus means includes fluid pressure operated piston means.

8. A hydrostatic steering apparatus according to claim 7 wherein said limiting position sensor means are plunger and cylinder devices for operating said fluid pressure operated piston means.

9. A hydrostatic steering apparatus according to claim 8 wherein the effective pressure areas of said plunger and cylinder devices are smaller than the effective area of said fluid pressure operated piston means.

10. A hydrostatic steering apparatus according to claim 8 including a return line extending to said tank means, conduit means between said devices and locking piston means and between said devices and said return line, throttle means between said devices and said return line, and pressure maintaining valve means in said return line downstream from said throttle means.

* * * * *